US010458877B1

(12) United States Patent
Fulton et al.

(10) Patent No.: US 10,458,877 B1
(45) Date of Patent: Oct. 29, 2019

(54) WATER LEAK DETECTION SYSTEMS FOR FLAT COMMERCIAL ROOF STRUCTURES

(71) Applicant: Molex, LLC, Lisle, IL (US)

(72) Inventors: Steven J. Fulton, Elgin, IL (US); Pankaj Sharma, Bolingbrook, IL (US); Jay Hennes, Savage, MN (US); Jesse J. Cole, Savage, MN (US); Martin L. Ganser, III, Saint Paul, MN (US); Daniel A. Balder, Bloomington, MN (US); Robert Irwin, Lakeville, MN (US); Michael Deppe, Batavia, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/963,226

(22) Filed: Apr. 26, 2018

(51) Int. Cl.
*G01M 3/16* (2006.01)
*E04D 13/00* (2006.01)

(52) U.S. Cl.
CPC ............. *G01M 3/16* (2013.01); *E04D 13/006* (2013.01)

(58) Field of Classification Search
CPC .. G08B 21/20; G08B 21/182; G08B 21/0484; G08B 3/10; G08B 5/36; G08B 21/18; G08B 25/08; G08B 13/1427; G08B 13/2497
USPC ....................................................... 340/605
See application file for complete search history.

(56) References Cited

U.S. PATENT DOCUMENTS

| 4,598,273 | A  | * | 7/1986  | Bryan, Jr. ............. | E04D 13/006 200/61.04 |
| 6,167,666 | B1 | * | 1/2001  | Kelly .................... | E04D 13/006 52/302.1 |
| 6,683,535 | B1 | * | 1/2004  | Utke ...................... | G01M 3/045 200/61.04 |
| 2006/0192678 | A1 | * | 8/2006  | Garabedian ............ | G08B 21/20 340/605 |
| 2011/0194102 | A1 | * | 8/2011  | Richardson ............ | G01K 11/32 356/73.1 |
| 2015/0303489 | A1 | * | 10/2015 | Wang ...................... | H01M 6/34 429/90 |
| 2017/0130459 | A1 | * | 5/2017  | Vokey ................... | E04D 13/006 |
| 2019/0011386 | A1 | * | 1/2019  | Park ....................... | G01N 17/00 |

* cited by examiner

*Primary Examiner* — Mark S Blouin
(74) *Attorney, Agent, or Firm* — Molex, LLC

(57) ABSTRACT

A leak detection system for flat commercial roof structures is disclosed in order to detect and subsequently repair a leak as soon as possible such that any damage to the roof, as well as to other structural and/or insulation components of the overall roof structure, can be minimized due to the absorption or migration of the water. The leak detection system may comprise elongated water detection sensor strips to be fixedly secured to at least two edge portions of insulation board assemblies, or alternatively, electrical circuits may be provided over the entire expanse of the major upper surface portion of each insulation board assembly, or alternatively still further, rolls of water detection sensor strips may be applied to different regions of the flat commercial roof structure.

22 Claims, 12 Drawing Sheets

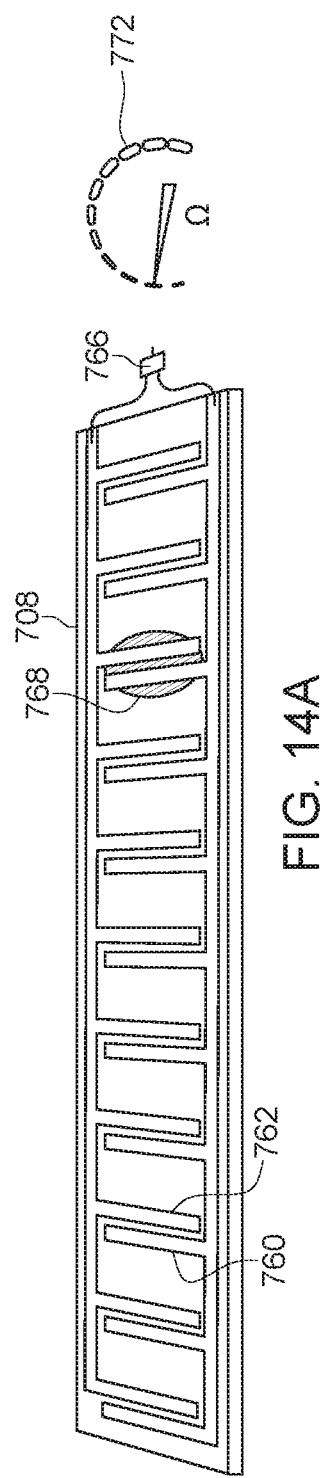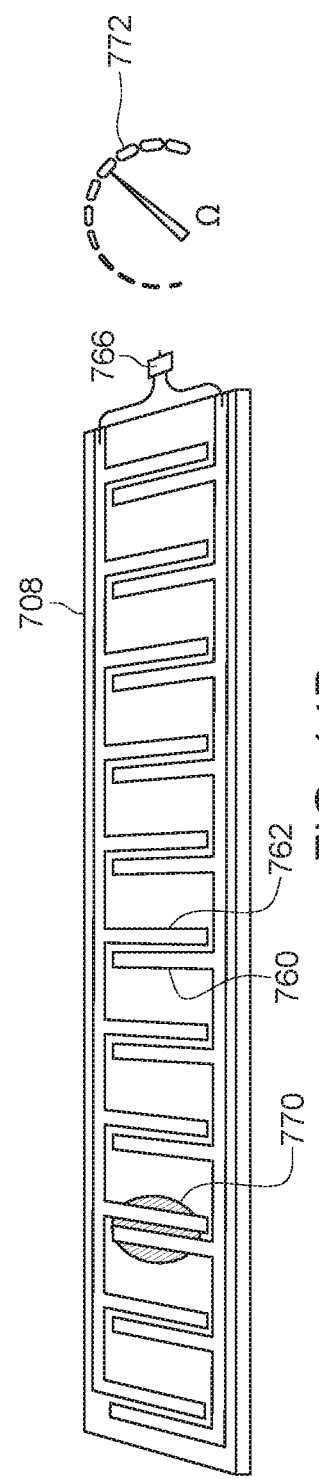

WATER LEAK DETECTION SYSTEMS FOR FLAT COMMERCIAL ROOF STRUCTURES

TECHNICAL FIELD

The present invention relates generally to leak detection systems for flat commercial roof structures, and more particularly to a new and improved leak detection system for use in connection with flat commercial roofs in order to detect and subsequently repair, a leak as soon as possible such that any damage to the roof, as well as to other structural and/or insulation components of the overall roof structure, can be minimized due to the absorption or migration of the water. The leak detection system may comprise elongated water detection sensor strips to be fixedly secured to at least two edge portions of insulation board assemblies, or alternatively, electrical circuits may be provided over the entire expanse of the major upper surface portion of each insulation board assembly, or alternatively still further, rolls of water detection sensor strips may be applied to different regions of the flat commercial roof structure.

BACKGROUND OF THE INVENTION

Conventional flat commercial roof structures normally utilize insulation boards or panels fixedly secured beneath the external layer of the roof structure which commonly comprises any one of a variety of conventional rubber roofing materials such as, for example, EPDM or ethylene propylene diene monomer rubber. One such conventional insulation board or panel, for use in conjunction with commercial flat roof structures, is illustrated in FIG. 1 and is generally indicated by the reference number 100. As is illustrated in FIG. 1, the conventional insulation board or panel 100 is usually eight feet (8.00") in length, four feet (4.00') wide, and one and one-half inches (1.5") thick. More particularly, the insulation board or panel 100 comprises a central core 102 comprising a closed-cell non-absorbent foam, and a pair of rugged cardboard sheets 104,106 which are disposed upon the opposite upper and lower faces of the central core 102 such that the insulation panel or board 100 effectively comprises a laminated structure. Unfortunately, with the use of such conventional flat commercial roof structure insulation boards, if a water leak develops, viable technology is not currently available to detect such leaks in order to minimize damage to the roof, as well as to other structural and/or insulation components of the overall roof structure, due to the absorption or migration of the water.

A need therefore exists in the art for a new and improved water leak detection system which can be used within, or in conjunction with, flat commercial roof structures. A yet further need exists in the art for a new and improved water leak detection system which can be used within, or in conjunction with, flat commercial roof structures so as to detect water leaks as soon as possible so as to, in turn, minimize any potential damage to the roof, as well as to other structural and/or insulation components of the overall roof structure, due to the absorption or migration of the water. Still an additional need exists in the art for a new and improved water leak detection system which can be used within, or in conjunction with, flat commercial roof structures so as to detect water leaks as soon as possible so as to, in turn, minimize any potential damage to the roof, as well as to other structural and/or insulation components of the overall roof structure, due to the absorption or migration of the water, and wherein the water leak detection system is relatively simple in structure. Yet an additional need exists in the art for a new and improved water leak detection system which can be used within, or in conjunction with, flat commercial roof structures so as to detect water leaks as soon as possible so as to, in turn, minimize any potential damage to the roof, as well as to other structural and/or insulation components of the overall roof structure, due to the absorption or migration of the water, and wherein the water leak detection system is relatively economical to install. Another need exists in the art for a new and improved water leak detection system which can be used within, or in conjunction with, flat commercial roof structures so as to detect water leaks as soon as possible so as to, in turn, minimize any potential damage to the roof, as well as to other structural and/or insulation components of the overall roof structure, due to the absorption or migration of the water, and wherein the water leak detection system is adaptable to different flat commercial roof structures which may have various adjunctive structures operatively associated with the roof structure. Still another need exists in the art for a new and improved water leak detection system which can be used within, or in conjunction with, flat commercial roof structures so as to detect water leaks as soon as possible so as to, in turn, minimize any potential damage to the roof, as well as to other structural and/or insulation components of the overall roof structure, due to the absorption or migration of the water, and wherein the water leak detection system is capable of embodying different forms in order to satisfy the various different needs of different roof structures and the installation costs thereof.

Still yet another need exists in the art for a new and improved water leak detection system which can be used within, or in conjunction with, flat commercial roof structures so as to detect water leaks as soon as possible so as to, in turn, minimize any potential damage to the roof, as well as to other structural and/or insulation components of the overall roof structure, due to the absorption or migration of the water, and wherein the water leak detection system is capable of being detected and communicated to a monitoring station which can, in turn, notify maintenance personnel that a water leak has in fact been detected and needs to be repaired.

SUMMARY OF THE INVENTION

The foregoing needs are met by means of a new and improved water leak detection system which has been developed in accordance with the principles and teachings of the present invention and which is integrally mounted upon, installed upon, or incorporated within the overall structure of an insulation board assembly utilized upon the roof structure. A plurality of insulation boards are adapted to be arranged within various different grid arrangements which cover the entire flat commercial roof structure. In addition, the new and improved water leak detection system comprises a water detection strip which is fixedly mounted upon at least two adjacent edge portions of the insulation board which are oriented orthogonally with respect to each other such that the water detection strip is effectively wrapped around a corner of the insulation board which is located at the intersection or junction of the two adjacent edge portions of the insulation board disposed orthogonally with respect to each other. Still further, end portions of the water detection strip can also be wrapped around two of the other diagonally opposite corner regions of the insulation board such that all four edge portions of the insulation board are effectively incorporated within the overall leak detection system. This permits other insulation boards within the overall insulation board grid structure to electrically interact with one another and thereby effectively provide water leak detection protection for the entire flat commercial roof structure.

The water detection strip is fabricated from PET (polyethylene terephthalate) or a similar material, and a pair of printed ink electrical wires or circuits, fabricated from silver or a similar material which exhibits high electrically conductive characteristics, are formed upon the water detection strip such that the pair of electrical wires or circuits are spaced a predetermined distance apart whereby the overall electrical circuit is normally open, however, the pair of electrical wires or circuits are also spaced sufficiently close to each other that if water, from, for example, a water leak, migrates between the pair of electrical wires or circuits, the electrical circuit will effectively be closed as a result of the water effectively making an electrical connection between the pair of electrical wires or circuits. In this case, data signals will be transmitted to a control station, located at a corner region of the insulation board, effectively reporting that a water leak has been detected. In turn, the control station will transmit data information reports, either by wired or wireless transmission means, to a remote central monitoring station whereby maintenance personnel can then take appropriate action in connection with the detected water leak. Power boosters are also disposed at predetermined locations around the insulation board grid so as to ensure that enough power is supplied to the printed ink electrical wires or circuits. Electrical connectors are also mounted at predetermined locations along the edge portions of the insulation boards so as to provide electrical and data interconnections between adjacent insulation boards comprising the overall insulation board grid arrangement. Each electrical connector comprises three, leaf-spring contacts which are respectively connected to ground, electrical power input, and data output through means of UART (universal asynchronous receiver-transmitter) hardware.

Alternatively, in lieu of the water detection strips fixedly mounted upon the edge portions of the insulation boards, different additional electrical circuit embodiments may be utilized so as to effectively cover the entire major upper surface portions of the insulation board assemblies. A first alternative embodiment comprises two electrical circuits arranged in an interdigitated pattern with respect to each other whereby individual portions of a first one of the two electrical circuits are disposed adjacent to individual portions of the second one of the two electrical circuits. As was the case with the printed ink circuits upon the water detection strips, the two electrical circuits are not electrically connected to each other whereby the overall electrical circuit is open, however, if water migrates into the gap or space defined between two of the adjacent interdigitated portions of the two electrical circuits, an electrical connection will be formed, and an electrical signal will be transmitted to the control station. Lastly, the electrical circuits may comprise printed ink circuits formed upon rolls of water detection strips whereby the rolls of water detection strips may be unrolled and secured to any desired region of the flat commercial roof structure and disposed within any desirable array or arrangement.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIGS. 14a and 14b are enlarged views schematically illustrating how the rolls of water detection sensor strips, as disclosed in FIG. 13, are used to detect the presence of a water leak and to determine the location of the water leak.

DETAILED DESCRIPTION OF THE PREFERRED EMBODIMENT

With reference now being made to the drawings, and more particularly to FIGS. 2-7, a first embodiment of a new and improved water leak detection system, which comprises a new and improved insulation board assembly 200 which has been developed in accordance with the principles and teachings of the present invention and which is to be utilized in conjunction with other insulation board assemblies 200 so as to form a first predetermined array of insulation board assemblies when disposed upon a flat commercial roof structure in order to provide water leak detection capabilities for the flat commercial roof structure, is disclosed.

Figure 1:
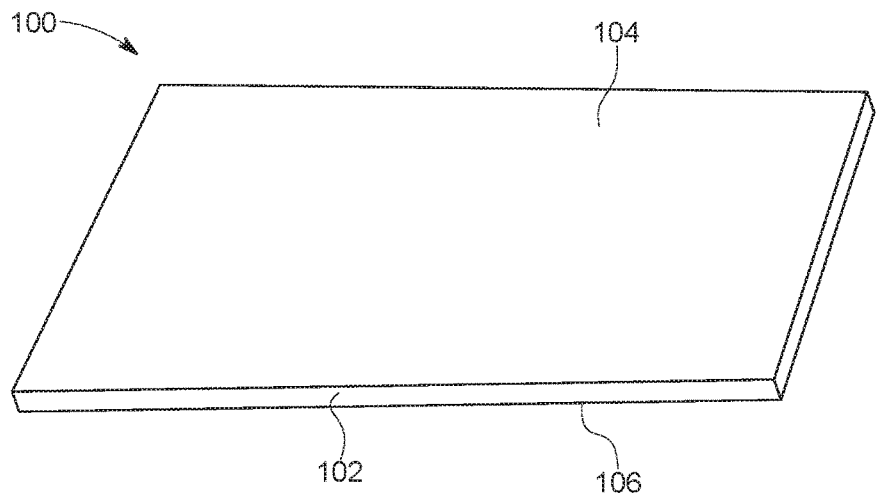
FIG. 1 is a perspective view of a conventional PRIOR ART insulation board commonly used in conjunction with flat commercial roof structures.
Figure 2:
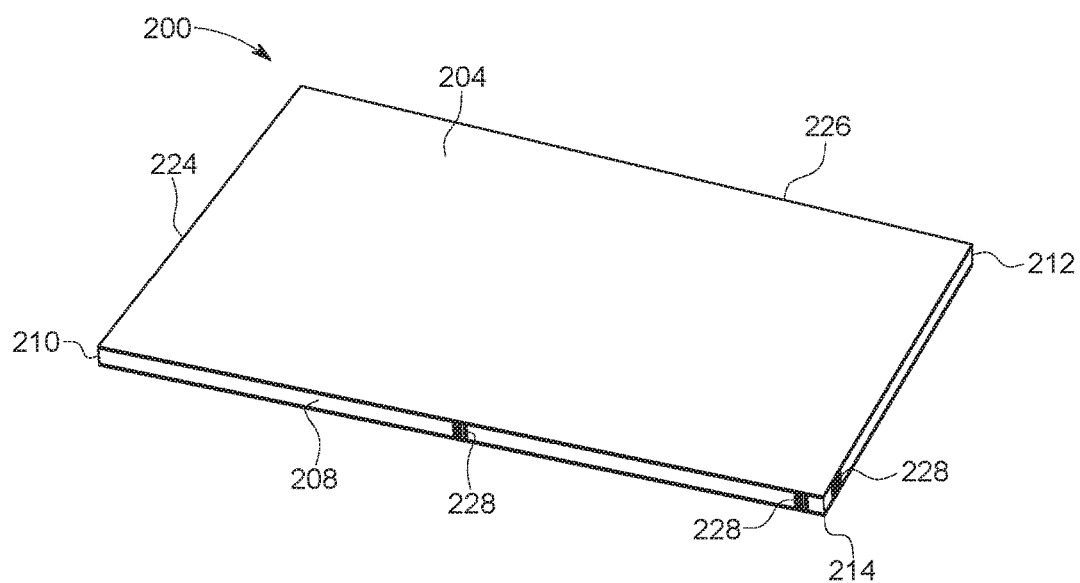
FIG. 2 is a perspective view of a first embodiment of a new and improved insulation board assembly having the new and improved water leak detection system of the present invention mounted upon the insulation board, wherein the water leak detection system comprises a sensor strip mounted upon at least two adjacent edge portions of the insulation board which are disposed orthogonally with respect to each other and wherein the sensor strip extends around the corner region of the insulation board which is located at the intersection or junction of the two adjacent edge portions of the insulation board which are disposed orthogonally with respect to each other.
Figure 3:
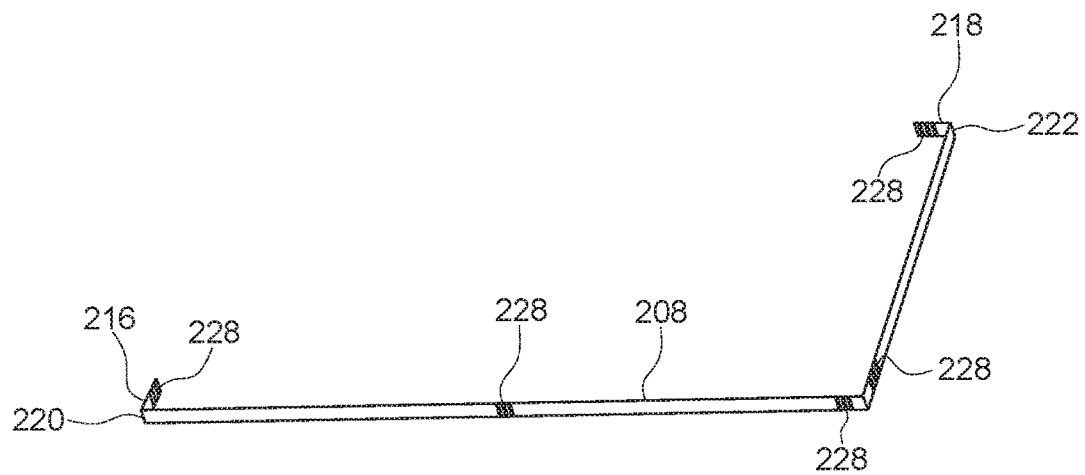
FIG. 3 is a perspective view of the sensor strip of the water leak detection system prior to its installation upon the two adjacent edge portions of the insulation board which are disposed orthogonally with respect to each other.

It is to be noted that component parts of the insulation board assembly 200, which is a primary component part of the water leak detection system of the present invention, that corresponds to the PRIOR ART insulation board assembly 100 as disclosed in FIG. 1, will be designated by corresponding reference numbers except that they will be in the 200 series. Accordingly, as was the case with the insulation board assembly 100 as illustrated in FIG. 1, it is to be appreciated that the insulation board assembly 200 comprises an insulation board or panel which is usually eight feet (8.00") in length, four feet (4.00') wide, and one and one-half inches (1.5") thick. In addition, the insulation board or panel comprises a central core comprising a closed-cell non-absorbent foam, and a pair of rugged cardboard sheets, only the upper cardboard sheet 204 being visible, which are disposed upon the opposite upper and lower faces of the central core such that the insulation panel or board 200 effectively comprises a laminated structure. Still further, in accordance with the particularly unique teachings and principles of the present invention, an elongated water detection sensor strip 208, as illustrated in FIGS. 2 and 3, is adapted to be fixedly secured to at least two adjacent edge portions 210,212 of the insulation board assembly 200 which are disposed orthogonally with respect to each other and which effectively meet at a corner region 214 of the insulation board assembly 200. In addition, it is seen that opposite end of the elongated water detection sensor strip 208 are provided with extension portions 216,218, which effectively extend around two other diagonally opposed corners portions 220,222 of the elongated water detection sensor strip 208, and the corresponding corner portions of the insulation board assembly 200, so as to effectively cover diagonally opposed end regions of the third and fourth sides 224,226 of the insulation board assembly 200. Alternatively, if desired, the elongated water detection sensor strip 208 can in fact be fixedly secured to all four edge portions 210,212,224, 226 of the insulation board assembly 200 so as to extend around the complete perimeter of the insulation board assembly 200.

The elongated water detection sensor strip 208 is fabricated from a suitable material, such as, for example, PET (polyethylene terephthalate) or a similar material, and a pair of printed ink electrical wires or circuits, not shown but fabricated from silver or a similar material which exhibits high electrically conductive characteristics, are formed upon the elongated water detection sensor strip 208 such that the pair of electrical wires or circuits are spaced a predetermined distance apart whereby the overall electrical circuit is normally open, however, the pair of electrical wires or circuits are also spaced sufficiently close to each other that if water, from, for example, a water leak, migrates between the pair of electrical wires or circuits, the electrical circuit will effectively be closed as a result of the water effectively forming the electrical connection between the pair of electrical wires or circuits. In this case, data signals will be transmitted to a control station, as will be discussed more fully hereinafter, which will effectively report that a water leak has been detected. As will also be discussed more fully hereinafter, the control station will transmit data information reports, either by wired or wireless transmission means, to a remote central monitoring station whereby maintenance personnel can then take appropriate action in connection with the detected water leak.

Figure 4:
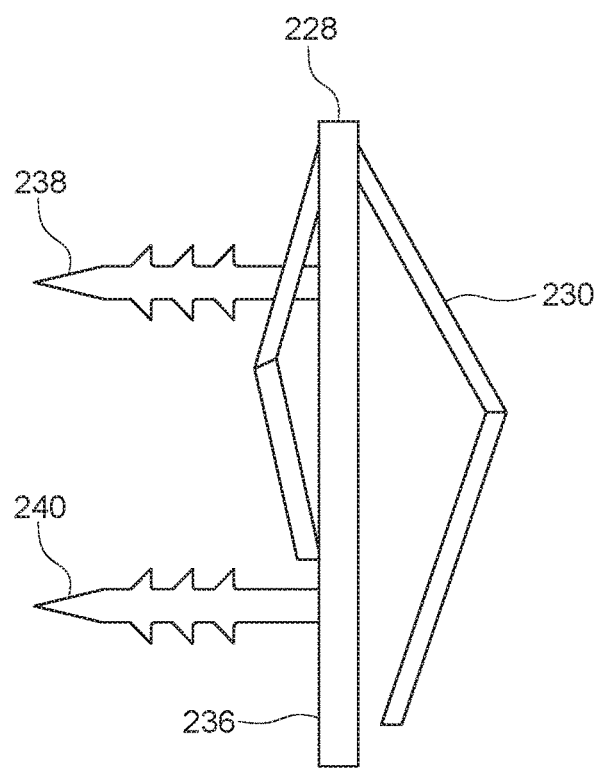
FIG. 4 is a side elevational view of one of a plurality of three leaf-spring contact members which are adapted to be mounted at predetermined locations upon the edge portions of the insulation board so as to provide ground, power input, and data output connections for the water leak detection system.
Figure 5:
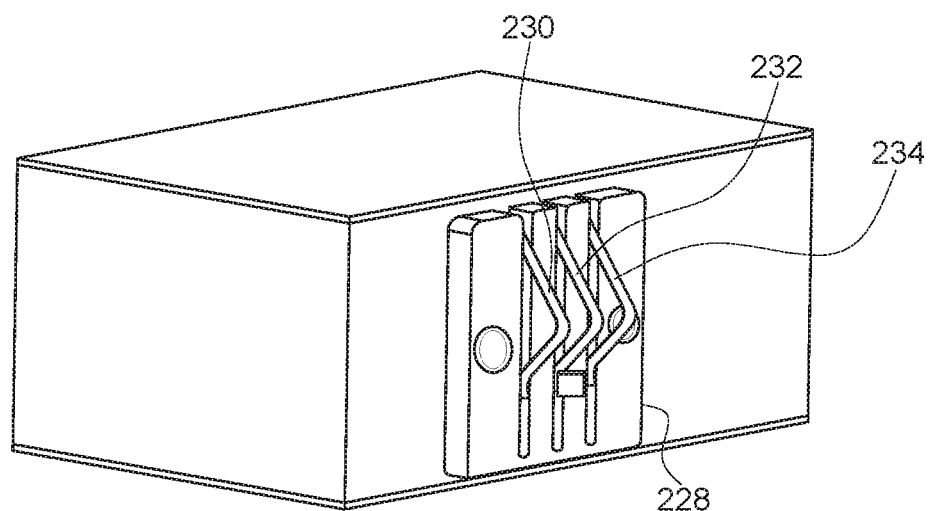
FIG. 5 is a perspective view of one of three leaf-spring contact member assemblies as mounted upon an edge portion of the insulation board.
Figure 6:
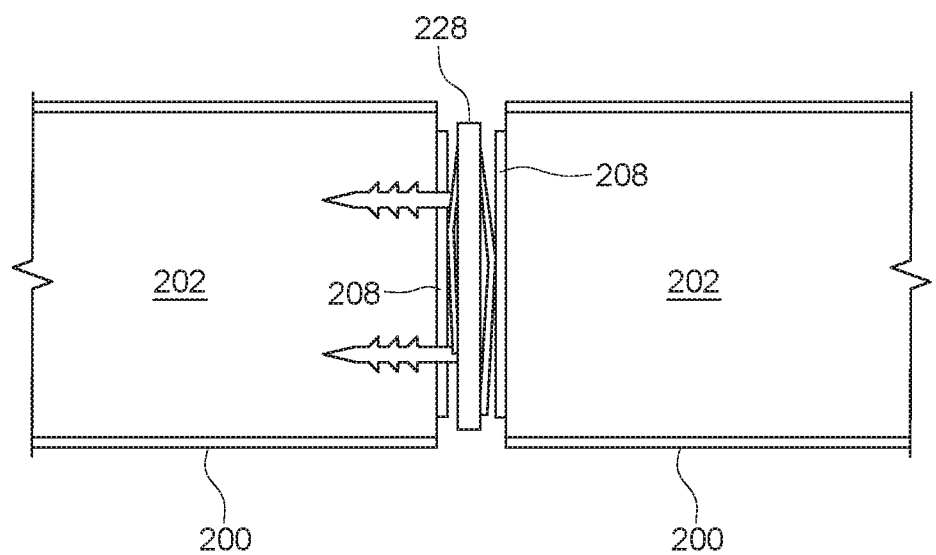
FIG. 6 is a cross-sectional view of two edge portions of adjacent insulation boards showing the interdisposition of one of the three leaf-spring contact member assemblies, as illustrated in FIG. 5, when the three leaf-spring contact member assembly is mounted upon one of the two adjacent insulation boards and how the leaf-spring contact members of the leaf-spring contact member assembly are disposed in electrical contact with the two sensor strips respectively mounted upon the edge portions of the two insulation boards.

A plurality of electrical connector assemblies 228, as can best be seen in FIGS. 4-6, are mounted at predetermined locations along the edge portions 210,212,216,218 of the elongated water detection sensor strip 208 as mounted upon the edge portions of the insulation board assembly 200 so as to provide electrical and data interconnections between adjacent insulation board assemblies 200 comprising the overall insulation board grid arrangement, as will also be more fully discussed hereinafter. Each electrical connector assembly 228 comprises three, leaf-spring contacts 230,232, 234 which are respectively connected to ground, electrical power input, and data output channels through means of UART (universal asynchronous receiver-transmitter) hardware. In addition, it is seen that the three, leaf-spring contacts 230,232,234 are mounted upon a substrate 236 from which a pair of barbed fasteners 238,240 project perpendicularly. In this manner, the electrical connector assembly 228 can be fixedly mounted upon an edge portion of the insulation board assembly 200 as a result of the barbed fasteners 238,240 being forced into the core portion 202 of the insulation board assembly 200 as can best be appreciated from FIG. 6. It is to be further appreciated from FIGS. 4 and 6 that each one of the three, leaf-spring contacts 230,232,234 comprises a pair of leaf spring members disposed upon opposite sides of the substrate 236 such that when the electrical connector assemblies 228 are interposed between a pair of adjacent insulation board assemblies 200,200, the three leaf contact members 230,232,234 comprising each one of the electrical connector assemblies 228 will be compressed and thereby effectively forced into good electrical contact with the printed circuits disposed upon the elongated water detection sensor strips 208 which are respectively disposed upon the oppositely disposed edge portions of the pair of adjacent insulation board assemblies 200,200.

Figure 7:
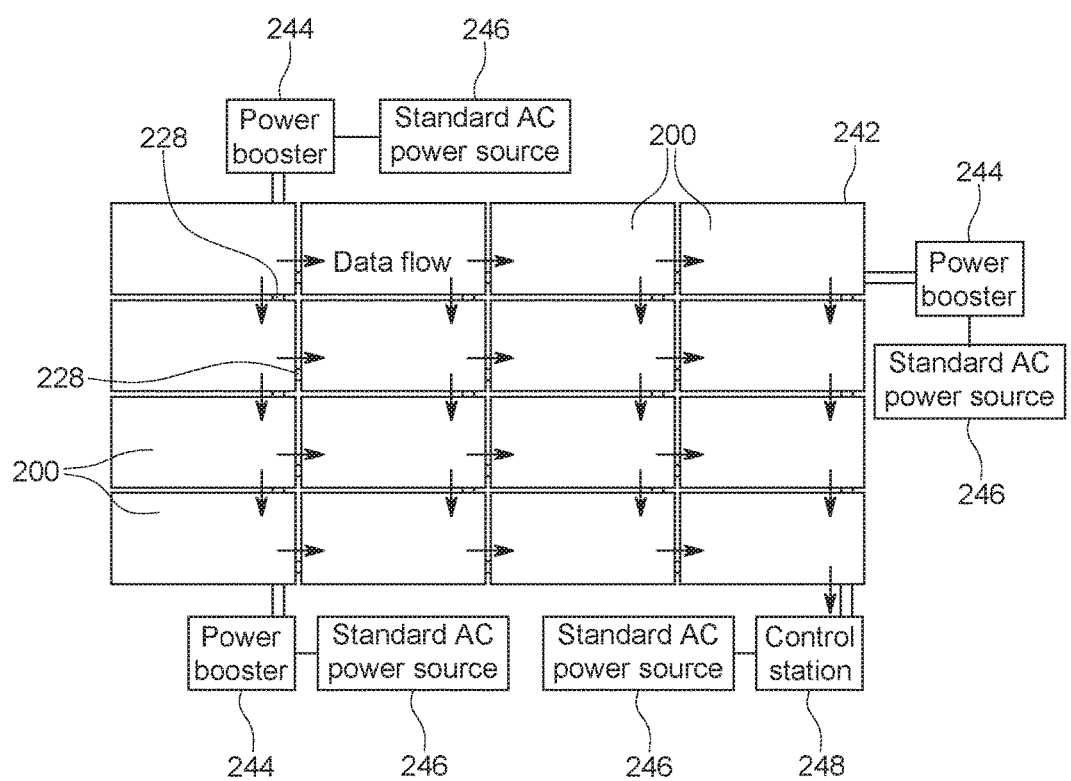
FIG. 7 is a schematic plan view illustrating how a plurality of the new and improved leak detection insulation board assemblies are mounted upon a flat commercial roof structure, in a first predetermined array or grid structure, so as to provide water leak detection capabilities for the flat commercial roof structure.

With reference now being made to FIG. 7, there is schematically illustrated a first embodiment of how a plurality of the new and improved leak detection insulation board assemblies 200 may be mounted upon a flat commercial roof structure in a predetermined grid structure 242 so as to effectively provide water leak detection capabilities for the flat commercial roof structure. More particularly, it is to be noted that the plurality of insulation board assemblies 200 forming the grid structure 242 are disposed within vertically and horizontally aligned columns and rows, and that each one of the insulation board assemblies 200 is provided with at least two electrical connector assemblies 228 which are respectively attached to the two adjacent edge portions of each insulation board assembly 200 which form the lower right corner region of each one of the insulation board assemblies 200. A plurality of power boosters 244, which are connected to a standard AC power source 246, are also disposed at predetermined locations around the insulation board grid structure 242 so as to ensure that sufficient power is supplied to the printed ink electrical wires or circuits of the elongated water leak detection sensor strips 208. Still further, a control station 248 is also electrically connected to the overall grid structure 242 and is provided for receiving reporting data signals from the various electrical connector assemblies 228 if a water leak is detected by means of a particular one of the electrical connector assemblies 228, and for transmitting a water leak detection report to a remote central monitoring station, not shown, whereby maintenance personnel can receive such report of a water leak and take the necessary steps to repair the detected water leak.

It is to be noted that each insulation board assembly 200 is provided with its own uniquely identifiable controller, such as, for example, a microcontroller unit (MCU), which communicates with the control station 248 over the common data communication lines. In this manner, the location associated with a reporting controller of a specific insulation board assembly 200 enables the water leak to be accurately detected and transmitted to the control station 248 by means of the data output channel of the UART (universal asynchronous receiver-transmitter) hardware. It is lastly to be noted that all of the insulation board assemblies 200 are provided with their electrical connector assemblies 228 located at the location or disposition with respect to each insulation board assembly 200 so that electrical connections can in fact be established from one insulation board assembly 200 to another insulation board assembly 200. For example, as can readily be appreciated from FIG. 7, the electrical connector assembly 228 that is located upon the right front corner edge portion of a first insulation board assembly 200 will be electrically connected to the electrical connector assembly 228 that is disposed upon the extension portion 218 of the elongated water detection sensor strip 208 which effectively wraps around the right rear edge portion of a second insulation board assembly 200 which is disposed in front of the first insulation board assembly 200.

Figure 8:
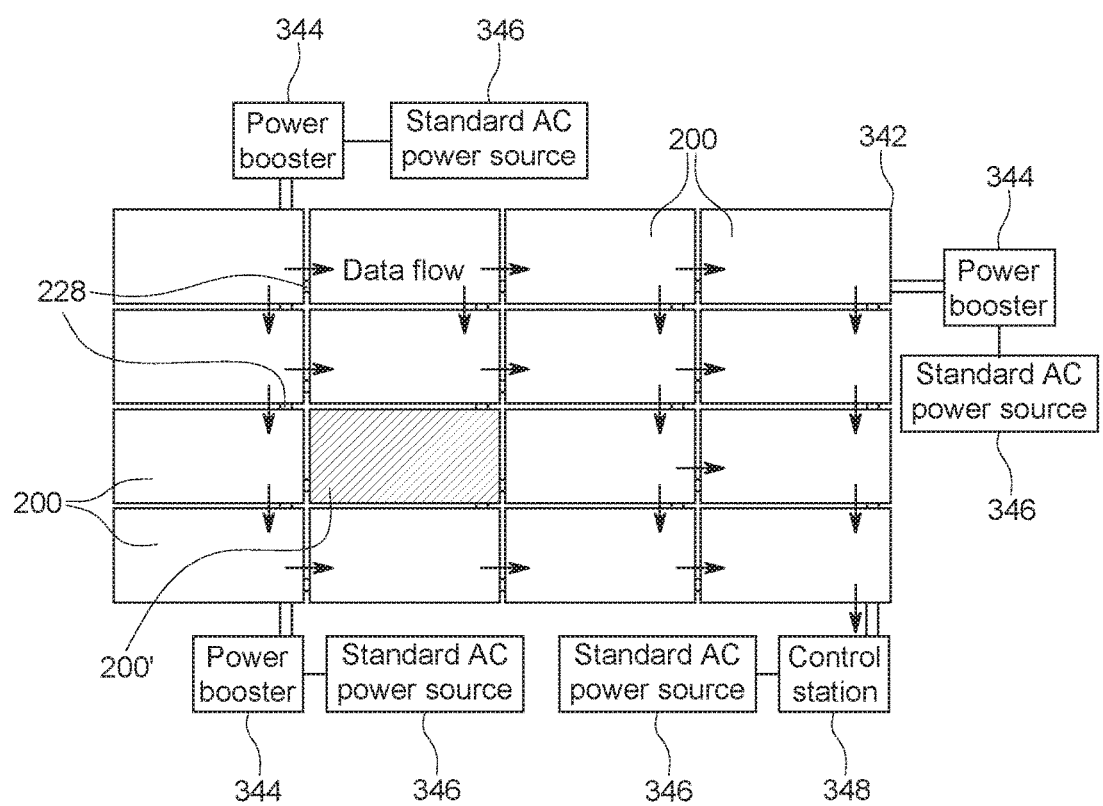
FIG. 8 is a schematic plan view similar to that of FIG. 7, showing, however, a grid structure wherein a particular location of the flat commercial roof structure is not provided with an insulation board assembly, or where the particular insulation board assembly is faulty, and yet data can nevertheless flow from all of the other insulation board assemblies to the control station so as to nevertheless remain capable of reporting detected water leaks.

With reference now being made to FIG. 8, there is illustrated a schematic view similar to that of FIG. 7, showing, however, a second grid structure 342 wherein at a particular location of the flat commercial roof structure, an insulation board assembly is absent, or alternatively, the insulation board assembly 200' is faulty, and yet data can nevertheless flow from all of the other insulation board assemblies 200 to the control station 348 such that the overall water leak detection system can nevertheless remain capable of reporting detected water leaks. It is to be noted that aside from the aforenoted difference between the grid structures 242 and 342 of FIGS. 7 and 8, all other features of the grid structures are essentially the same and therefore the component parts of the grid structure 342 have been denoted by reference numbers corresponding to the component parts of the grid structure 242 except that they are within the 300 series.

Figure 9:
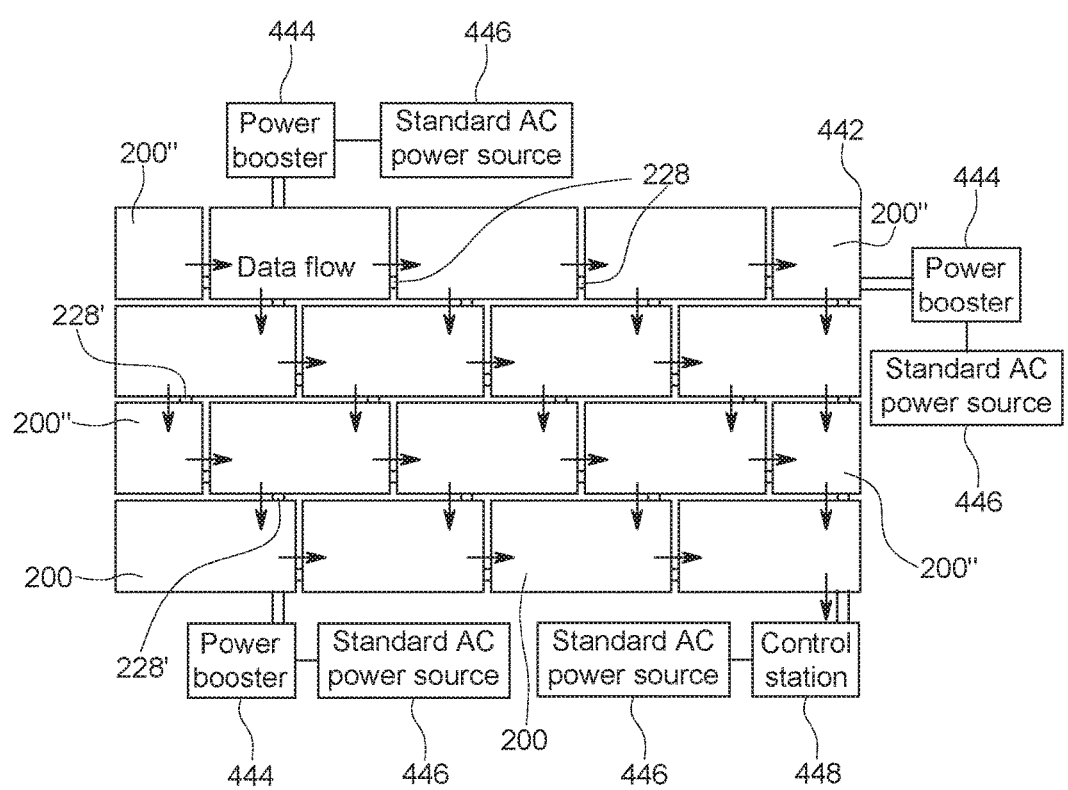
FIG. 9 is a schematic plan view similar to that of FIG. 7, showing, however, a grid structure wherein the plurality of insulation board assemblies are aligned within each horizontally extending row, however, the insulation board assemblies are offset vertically with respect to each other such that the overall grid structure comprises a "brick" arrangement.

With reference now being made to FIG. 9, there is illustrated a schematic view similar to that of FIGS. 7 and 8, showing, however, a third grid structure 442 wherein, in lieu of the plurality of insulation board assemblies 200 being disposed within the grid structure 442 such that all of the insulation board assemblies 200 are aligned within vertical columns and horizontal rows, in the grid structure 442, the plurality of insulation board assemblies 200 are disposed within horizontally aligned rows, however, the plurality of insulation board assemblies 200 are misaligned or offset vertically so as to effectively define a "brick" arrangement.

Therefore, such a grid structure 442 requires some modifications with respect to the insulation board assemblies 200 comprising the second and third grid structures 242 and 342. More particularly, is it noted, for example, that in lieu of the electrical connector assemblies 228 being located upon the intersecting edge portions of each insulation board assembly 200 which effectively defines the lower right corner of the particular insulation board assembly 200, in order to provide the proper electrical connections within this grid structure 442, each insulation board assembly 200 is still provided with an electrical connector assembly 228 upon the right side edge portion, however, the electrical connector assembly 228 that was previously provided upon the lower bottom edge portion of the insulation board assembly 200 has now been moved to a substantially central location of the lower bottom edge portion of the insulation board assembly as noted at 228'. Another difference to be noted within the third grid structure 442 is that some of the insulation board assemblies do not comprise 4×8 laminated boards but, to the contrary, comprise 4×4 laminated boards so as to be accommodated, for example, within corner or side regions of the grid structure 442 as illustrated at 200". In this manner, data can nevertheless flow from all of the insulation board assemblies 200 to the control station 448 such that the overall water leak detection system can is viable so as to report detected water leaks. It is to be noted that aside from the aforenoted differences between the grid structures 242, 342 of FIGS. 7 and 8, all other features of the grid structure 442 are essentially the same and therefore the component parts of the grid structure 442 have been denoted by reference numbers corresponding to the component parts of the grid structures 242,342 except that they are within the 400 series.

Figure 10:
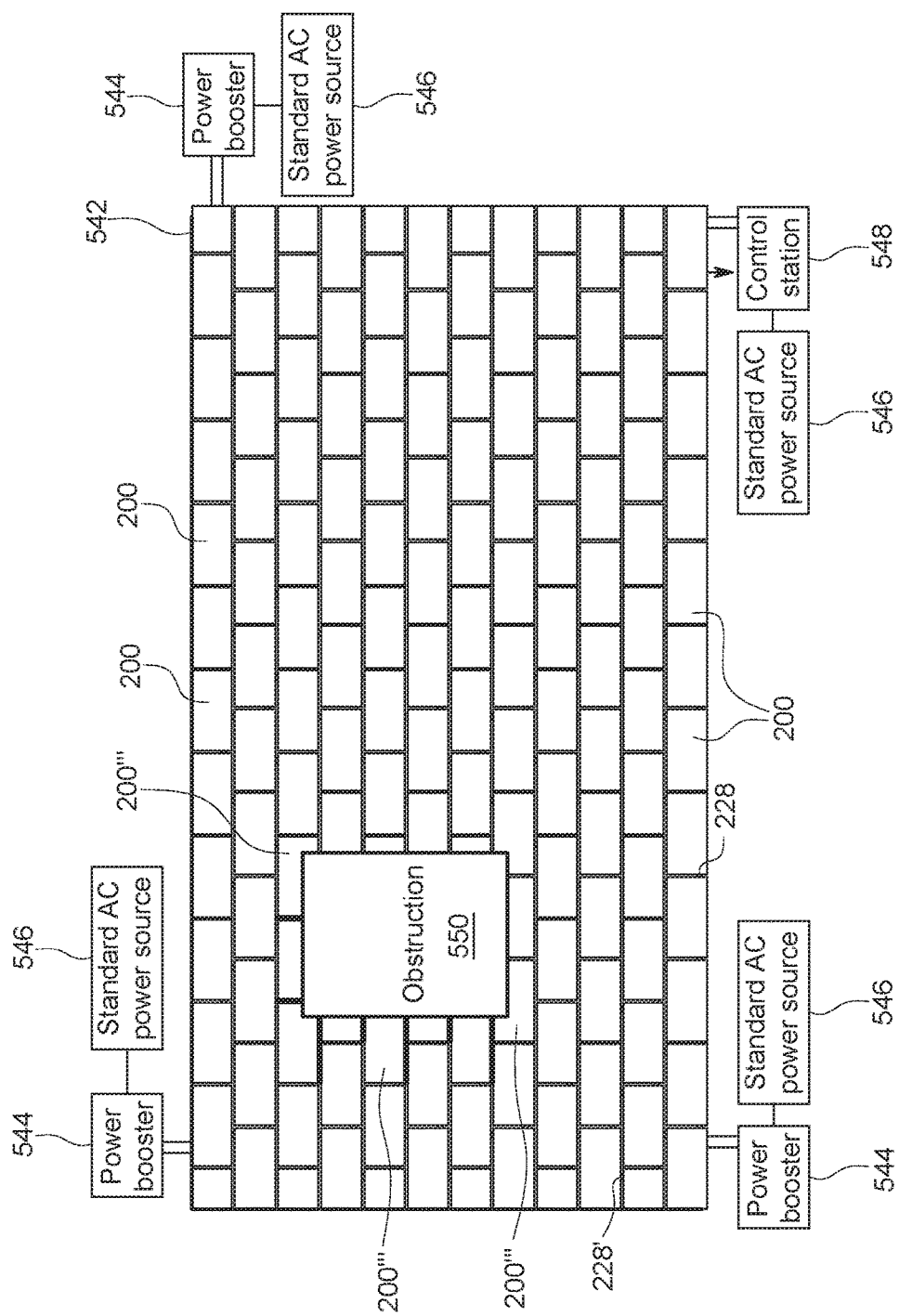
FIG. 10 is a schematic plan view similar to that of FIG. 9, showing, however, a grid structure wherein the disposition of the plurality of insulation board assemblies has to accommodate a structural obstruction at a particular location, necessitating the fact that not each insulation board assembly will have a substantially rectangular configuration.
Figure 11A:
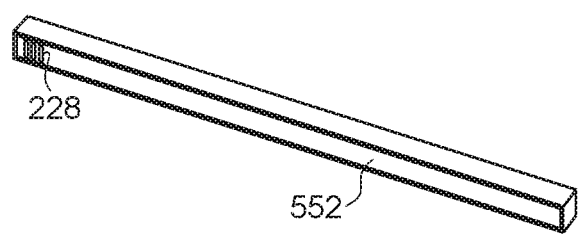
FIGS. 11a and 11b disclose filler pieces which are to be used in conjunction with those insulation board assemblies which are disposed within the grid structure of FIG. 10 and which had to have had their geometrical configurations altered so as to accommodate the structural obstruction.
Figure 11B:
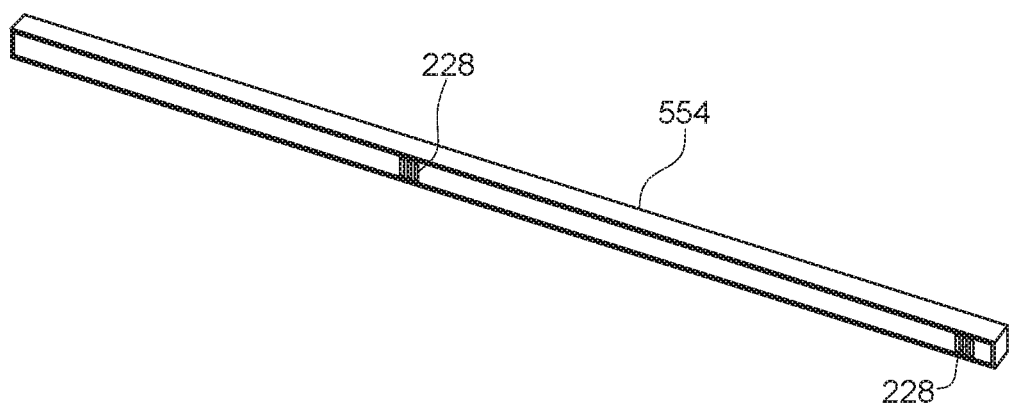

Turning now to FIG. 10, there is illustrated a schematic view similar to that of FIG. 9, showing, however, a fourth grid structure 542 wherein an obstruction 550, such as, for example, a chimney or a utility box, is disposed within the central portion of the grid structure 542 and therefore the plurality of insulation board assemblies 200 must be applied to the roof structure in the desired array while accommodating or accounting for the presence of the obstruction 550. Accordingly, it is to be appreciated that a number of the insulation board assemblies, as illustrated at 200''', will have to be cut from their normal 4×8 size dimensions to other dimensions such that these particular insulation board assemblies 200''' can be properly fitted around the obstruction 550. It is further noted that due to the abnormal geometrical configurations comprising these particular insulation board assemblies 200''', the electrical connector assemblies 228 normally operatively connected to the insulation board assemblies 200 may not in fact be capable of being electrically connected to these abnormally shaped insulation board assemblies 200''' at the necessary or required locations. Accordingly, filler pieces 552,554, as illustrated in FIGS. 11a and 11b and having various dimensions, such as, for example, 4×1 or 8×1, or any other size that proves necessary in order to achieve the desired electrical connections, can be utilized in conjunction with the abnormally configured insulation board assemblies 200'''. Still yet further, if circumstances do not permit the filler pieces 552,554 to be utilized, other electrical cables and electrical connectors, not shown, may be employed. It is to be noted that aside from the aforenoted differences between the grid structures 442,542 of FIGS. 9 and 10, all other features of the grid structure 542 are essentially the same and therefore the component parts of the grid structure 542 have been denoted by reference numbers corresponding to the component parts of the grid structures 442 except that they are within the 500 series.

Lastly, and alternatively, in lieu of the water detection strips 208 fixedly mounted upon the edge portions of the insulation board assemblies 200, different additional electrical circuit embodiments may be utilized so as to effectively cover the entire major upper surface portions of the insulation board assemblies 200. A first alternative embodiment of such an insulation board assembly is disclosed in FIG. 12 and is generally designated by the reference character 600. More particularly, it is seen that in lieu of the water detection strips 208 being fixedly secured to the edge portions of the insulation board assembly, the insulation board assembly 600 comprises two separate ink-printed electrical circuits 656,658, each one of which is provided with one or more power boosters 644 which are electrically connected to a standard AC power source 646. A control station is disclosed at 648, and it is seen that each one of the two separate electrical circuits 656,658 have sections which are effectively interdigitated with respect to each other as illustrated at 660,662 wherein the sections 660,662 are disposed adjacent to each other but are sufficiently separated from each other so as not to comprise a closed circuit. On the other hand, if a water leak develops and water effectively migrates between the two adjacent sections 660,662 of the electrical circuits 656,658 so as to form an electrical connection therebetween, the water leak will be detected and reported to the control station 648 so as to, in turn, be reported to the remote monitoring station such that maintenance personnel can be dispatched in order to rectify the water leak. As was the case with the insulation board assemblies 200, each insulation board assembly 600 is likewise provided with electrical connector assemblies 628 at the lower right corner region so as to provided electrical connection to adjacent insulation board assemblies 600. The major advantage of this insulation board assembly 600 as compared to the previously noted insulation board assemblies 200, or its variants, is that larger areas of the insulation board assembly 600 is effectively provided with water leak detection capabilities. It is to be noted that aside from the aforenoted differences between the system of FIG. 12 as compared to the previously disclosed systems, all other features of the system 600 are similar and therefore the component parts of the 600 have been denoted by reference numbers corresponding to the component parts of the previous system assemblies except that they are within the 600 series.

Figure 12:
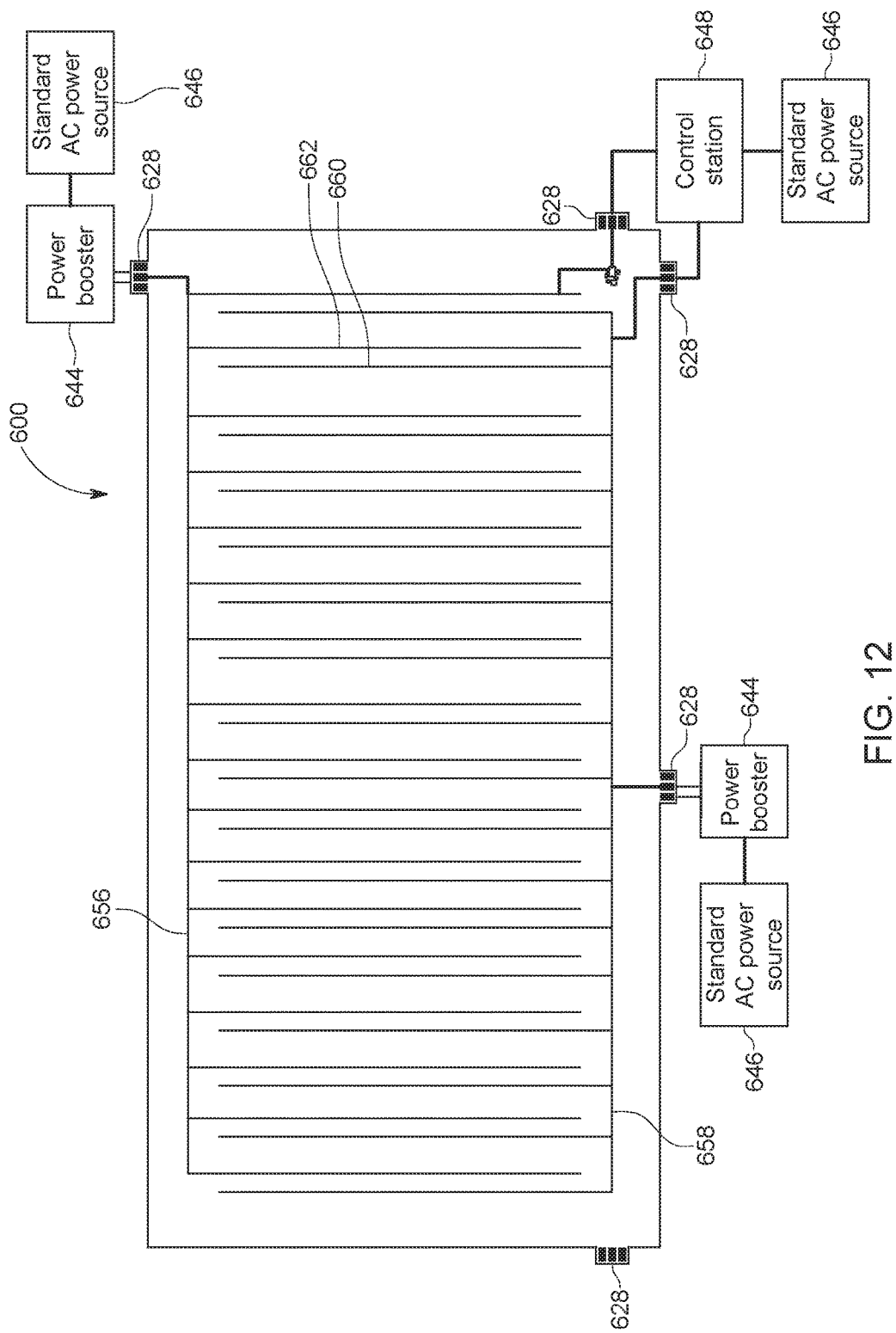
FIG. 12 is a plan view of an insulation board assembly wherein, in lieu of the use of the elongated water detection sensor strips fixedly secured to edge portions of each insulation board assembly, the entire upper major surface of the insulation board assembly is provided with two separate, open electrical circuits which become closed when water migrates into the space defined between adjacent circuit portions of the two separate electrical circuits.
Figure 13:
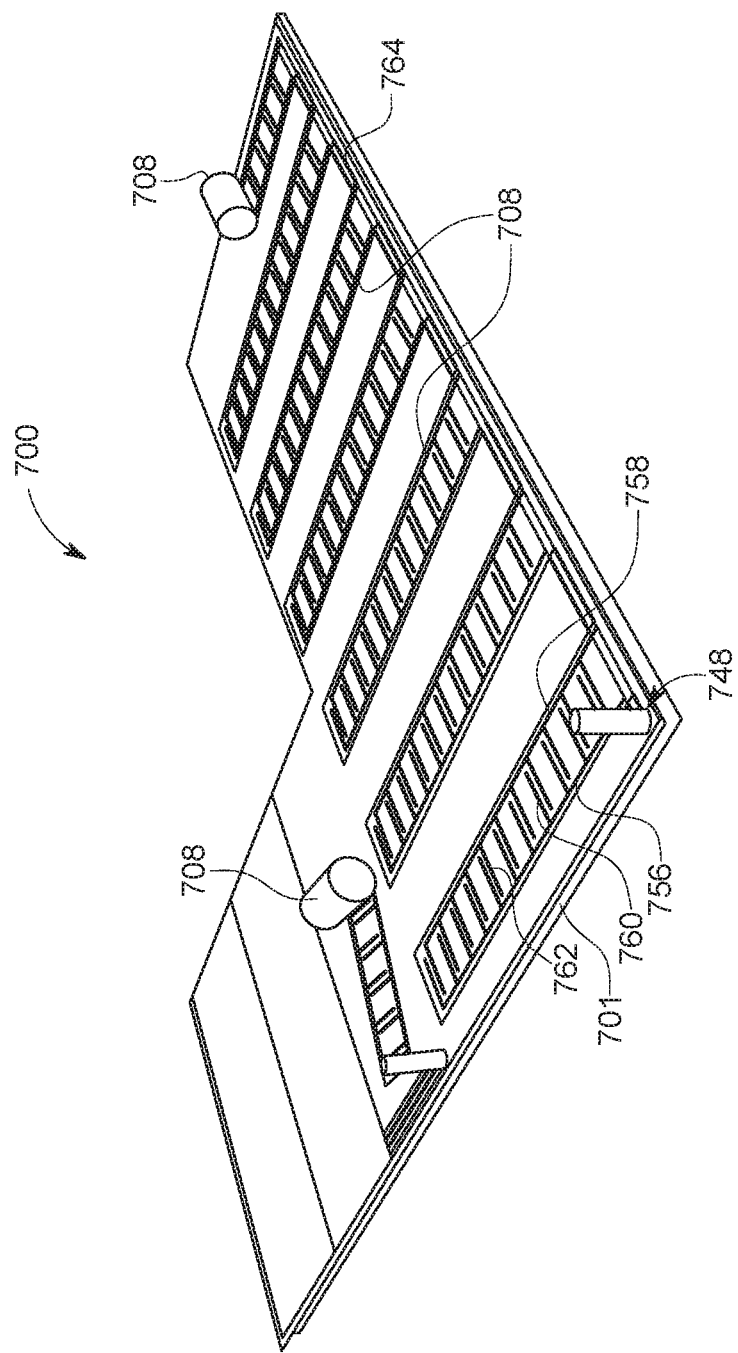
FIG. 13 is a perspective view of a roof structure having, for example, a configuration which is other than rectangular and which is therefore readily adaptable for rolls of water detection sensor strips to be secured, for example, at different locations and with different distances defined between adjacent pairs of the rolls of water detection sensor strips.

Still yet further, in lieu of utilizing insulation board assemblies, as has been previously disclosed in connection with FIGS. 2-11 wherein the insulation board assemblies 200 had the elongated water detection sensor strips 208 mounted upon edge portions of the insulation board assemblies, or as disclosed within FIG. 12 wherein the electrical circuits could be provided directly upon the major upper surface portions of the insulation board assemblies 600, the electrical circuits may comprise printed ink circuits formed upon rolls of water detection strips whereby the rolls of water detection strips may be unrolled and secured to any desired region of the flat commercial roof structure and in accordance with any desirable array or arrangement determined to provide leak detection capabilities over the major upper surfaces of the insulation board assemblies. More particularly, as can best be seen and appreciated from FIG. 13, there is disclosed, for example, a flat commercial roof structure which has a substantially L-shaped configuration such that the roof structure is effectively divided into two different sections noted as Roof Zone A and Roof Zone B. Accordingly, the two different roof sections may require, or may be advantageously susceptible to, a different mode of protection, as opposed to the previously disclosed insulation board assemblies as have been previously disclosed in FIGS. 2-12, when it comes to water leak detection. In accordance with these additional principles and teachings of the present invention, and referring only to Roof Zone B as an example, a water leak detection system, generally indicated by the reference number 700, comprises the use of rolls of water detection strips 708 which can be understood to effectively comprise a hybrid of the water detection sensor strips 208, as shown in FIG. 2, and the electrical circuits 660,662 shown in FIG. 12. Accordingly, structural components of the system 700 which correspond to structural components of the previously disclosed systems will be noted by corresponding reference numbers except that they will be in the 700 series.

It is seen that the flat commercial roof structure comprises a substrate 701 atop which the plurality of rolls of water detection strips 708 are to be unrolled and affixed to the substrate. The plurality of rolls of water detection strips 708 are then adapted to be covered by means of a suitable environmental protective layer fabricated from a suitable material, such as, for example, EPDM (ethylene propylene diene monomer) rubber or the like. Each one of the water detection strips 708, when unrolled from the supply roll, is provided with two separate electrical circuits 756,758 wherein the two separate electrical circuits comprise interdigitated portions 760,762 are disposed adjacent to, but separated from, each other by means of a predetermined spacing or gap. Accordingly, the electrical circuits 756,758 comprise open circuits, however, should water migrate into the space or gap defined between a pair of interdigitated portions 760,762, the electrical circuit will effectively be closed thereby sending an electrical signal to a suitable readout or control station 748. It is to be additionally noted that the system 700 comprises a plurality of water detection strips 708 which may be positioned in a parallel arrangement with respect to each other, as is illustrated, and that one end of each one of the water detection strips 708 is electrically connected to a common bus 764 which is electrically connected to the readout or control station 748. It is thus to be appreciated that the system 700 has various operational advantages, such as, for example, the fact that the water detection strips 708 can easily be placed at different locations upon the underlying roof structure 701, they can easily be placed upon roof structures having different geometrical configurations, the spacing between the water detection strips 708 can be varied depending upon the degree of water leak detection is desired or required and they can easily be mounted upon the underlying roof structure 701 on site.

Figure 15:
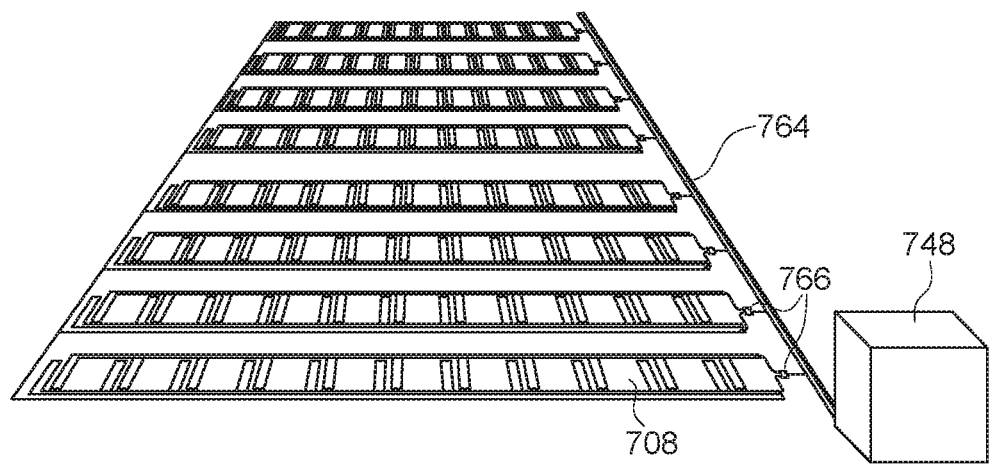
FIG. 15 is a schematic view similar to that of FIG. 13 illustrating how a plurality of rolls of water detection sensor strips are connected to a single control module which will report the detection of a water leak to a remote monitoring station so that maintenance personnel can be dispatched to repair the water leak.

Referring now to FIGS. 14a,14b, and 15, a pair of water detection strips 708 are disclosed in FIGS. 14a and 14b, and it is seen that one end of each water detection strip 708 is adapted to be electrically connected to a suitable microcontroller unit (MCU) 766 which, in turn, is adapted to be connected to the common bus 764 which leads to the readout module or control station 748. As illustrated in FIGS. 14a and 14b, water leaks have been detected at regions 768 and 770. Region 768 is located closer to its microcontroller unit (MCU) 766 than is region 770 relative to its microcontroller unit (MCU) 766, and since the measured resistance is proportional to the distance that the water leak region 768,770 is located from its microcontroller unit (MCU) 766, as illustrated by means of the analog icons 772, the location of the water leak region 768,770 can be readily determined. It is to be noted further that beneath each pair of spaced, interdigitated circuit portions 760,762, a substrate, fabricated from a suitable nonwoven material and impregnated with a suitable substance, such as, for example, poly(sodium acrylate), can be disposed. The purpose of such substrate, impregnated with poly(sodium acrylate), is to render the nonwoven material significantly more conductive when exposed to moisture, thereby significantly enhancing the water detection properties of the water leak detection system 700. As was the case with the previous embodiments of the present invention as embodied within the insulation board assemblies 200, the readout module or control station 748 is able to uniquely address, identify, or communicate over the signal or communication lines with each microcontroller unit (MCU) 766 operatively and electronically connected to each one of the water detection strips 708 so as to easily identify which water detection strip 708 is issuing a water leak detection signal whereby the location of the water leak is easily and readily identifiable.

Obviously, many variations and modifications of the present invention are possible in light of the above teachings. It is therefore to be understood that within the scope of the appended claims, the present invention may be practiced otherwise than as specifically described herein.

What is claimed is:

1. A water leak detection system for use in connection with flat commercial roof structures, comprising:
an insulation board assembly, with a flat top and bottom surface and four side surfaces, fixedly secured to the flat commercial roof structure;
a water detection sensor strip having a pair of separate electrical circuits fixedly secured thereon and spaced apart from each other by means of a predetermined gap so as to thereby define a normally open electrical circuit upon said water detection sensor strip, said water detection sensor strip being fixedly secured to at least two side surfaces of said insulation board assembly;
an electrical power source electrically connected to said normally open electrical circuit defined upon said water detection sensor strip; and
a control station electrically connected to said normally open electrical circuit defined upon said water detection sensor strip for receiving a water detection signal, from said normally open electrical circuit defined upon said water detection sensor strip, which is generated from said normally open electrical circuit defined upon said water detection sensor strip when water migrates into said gap defined between said pair of separate electrical circuits so as to effectively bridge said gap and thereby close said normally open electrical circuit.

2. The water leak detection system as set forth in claim 1, wherein:
said insulation board assembly comprises a laminated structure comprising a central core fabricated from a closed-cell non-absorbent foam, and a pair of cardboard sheets disposed upon opposite upper and lower major surface portions of said central core.

3. The water leak detection system as set forth in claim 1, wherein:
said water detection sensor strip is fixedly secured to at least two adjacent side surfaces of said insulation board assembly.

4. The water leak detection system as set forth in claim 3, wherein:
said water detection sensor strip, fixedly secured to said at least two adjacent side surfaces of said insulation board assembly, are secured to a front side surface of said insulation board assembly and a right side surface of said insulation board assembly.

5. The water leak detection system as set forth in claim 4, wherein:
said water detection sensor strip, fixedly secured to said front side surface of said insulation board assembly and said right side surface of said insulation board assembly, also comprise water detection sensor strip extensions which wrap around a left side surface of said insulation board assembly and a rear side surface of said insulation board assembly.

6. The water leak detection system as set forth in claim 5, further comprising:
a plurality of electrical connectors respectively provided upon said portions of said water detection sensor strip covering said front side surface of said insulation board assembly and said right side surface of said insulation board assembly, as well as upon said water detection sensor strip extensions extending over said left side surface of said insulation board assembly and said rear side surface of said insulation board assembly, so as to permit a plurality of insulation board assemblies, likewise provided with said water detection sensor strip, said water detection sensor strip extensions, and said plurality of electrical connectors, to be electrically connected to each other.

7. The water leak detection system as set forth in claim 6, wherein:
each one of said plurality of electrical connectors comprises three, leaf-spring contacts which are respectively connected to ground, electrical power input, and data output channels through means of UART (universal asynchronous receiver-transmitter) hardware.

8. The water leak detection system as set forth in claim 7, wherein:
said insulation board assembly is provided with its own uniquely identifiable controller which communicates with said control station by means of said data output channel such that the location, at which a water leak is detected, is able to be accurately identified and reported to said control station by means of said data output channel of said UART (universal asynchronous receiver-transmitter) hardware.

9. The water leak detection system as set forth in claim 6, wherein:

said plurality of insulation board assemblies are arranged within a grid structure wherein said plurality of insulation board assemblies are aligned with each other in vertically extending columns and horizontally extending rows.

10. The water leak detection system as set forth in claim 6, wherein:
said plurality of insulation board assemblies are arranged within a grid structure wherein said plurality of insulation board assemblies are aligned with each other in horizontally extending rows but are misaligned with respect to each other in vertically extending columns such that said grid structure has a "brick" appearance.

11. A water leak detection system for use in connection with flat commercial roof structures, comprising:
an insulation board assembly fixedly secured to the flat commercial roof structure, wherein said insulation board assembly comprises upper and lower major surface portions, wherein the insulation board substantially covers an entire surface area of the flat commercial roof structure;
a pair of separate electrical circuits, spaced from each other by means of a predetermined gap, fixedly secured to said upper major surface portion of said insulation board assembly so as to substantially cover all portions of said upper major surface portion of said insulation board assembly and thereby define a normally open electrical circuit upon said upper major surface portion of said insulation board assembly, each one of said pair of electrical circuits comprises a plurality of electrical paths wherein each electrical path of a first one of said pair of electrical circuits is disposed adjacent to an electrical path of a second one of said pair of electrical circuits such that said electrical paths of said first one of said pair of electrical circuits are disposed in an interdigitated manner with respect to said electrical paths of said second one of said pair of electrical circuits;
an electrical power source electrically connected to said normally open electrical circuit defined upon said upper major surface portion of said insulation board assembly; and
a control station electrically connected to said normally open electrical circuit defined upon said upper major surface portion of said insulation board assembly for receiving a water leak detection signal, from said normally open electrical circuit defined upon said upper major surface portion of said insulation board assembly, which is generated from said normally open electrical circuit defined upon said upper major surface portion of said insulation board assembly when water migrates into said gap defined between said pair of two separate electrical circuits so as to close said normally open electrical circuit.

12. The water leak detection system as set forth in claim 11, wherein:
said insulation board assembly comprises a laminated structure comprising a central core fabricated from a closed-cell non-absorbent foam, and a pair of cardboard sheets disposed upon opposite upper and lower major surface portions of said central core.

13. The water leak detection system as set forth in claim 11, further comprising:
a plurality of electrical connectors respectively provided upon front, right side, left side, and rear edge portions of said insulation board assembly so as to permit a plurality of insulation board assemblies, likewise provided with said plurality of electrical connectors, to be electrically connected to each other.

14. The water leak detection system as set forth in claim 13, wherein:
each one of said plurality of electrical connectors comprises three contacts which are respectively connected to ground, electrical power input, and data output channels through means of UART (universal asynchronous receiver-transmitter) hardware.

15. The water leak detection system as set forth in claim 14, wherein:
said plurality of insulation board assemblies are arranged within a grid structure wherein said plurality of insulation board assemblies are aligned with each other in vertically extending columns and horizontally extending rows.

16. The water leak detection system as set forth in claim 14, wherein:
said plurality of insulation board assemblies are arranged within a grid structure wherein said plurality of insulation board assemblies are aligned with each other in horizontally extending rows but are misaligned with respect to each other in vertically extending columns such that said grid structure has a "brick" appearance.

17. A water leak detection system for use in connection with flat commercial roof structures, comprising:
a flat substrate; and
a plurality of rolls of water detection strips, each one of said rolls of water detection strips having a pair of separate electrical circuits fixedly secured thereon and spaced apart from each other by means of a predetermined gap so as to thereby define a normally open electrical circuit upon each one of said water detection strips, said plurality of water detection strips being fixedly secured to said flat substrate when said plurality of rolls of water detection strips are unrolled, each one of said pair of separate electrical circuits comprises a plurality of electrical paths wherein each electrical path of a first one of said pair of electrical circuits is disposed adjacent to an electrical path of a second one of said pair of electrical circuits such that said electrical paths of said first one of said pair of electrical circuits are disposed in an interdigitated manner with respect to said electrical paths of said second one of said pair of electrical circuits;
a bus line electrically connected to each one of said normally open electrical circuits defined upon said plurality of water detection strips; and
a control station electrically connected to said bus line for receiving a water detection signal, from any one of said normally open electrical circuits defined upon said plurality of water detection strips, which is generated from a particular one of said plurality of normally open electrical circuits defined upon said plurality of water detection strips when water migrates into said gap defined between said pair of separate electrical circuits defined upon said particular one of said plurality of normally open electrical circuits so as to effectively bridge said gap and thereby close said normally open electrical circuit.

18. The water leak detection system as set forth in claim 17, wherein:
said plurality of rolls of water detection strips can be applied to roof structures having various different geometrical configurations.

19. The water leak detection system as set forth in claim 17, wherein:

said plurality of rolls of water detection strips can be applied to roof structures in various different patterns.

20. The water leak detection system as set forth in claim 17, wherein:
said plurality of rolls of water detection strips can be applied to roof structures with various different distances defined between successive ones of said plurality of rolls of water detection strips.

21. The water leak detection system as set forth in claim 17, wherein:
measured resistance values across said pair of separate electrical circuits fixedly secured upon any one of said plurality of rolls of water detection strips is indicative of the location of the water leak as detected by said one of said plurality of rolls of water detection strips.

22. The water leak detection system as set forth in claim 17, wherein:
a plurality of microcontroller units (MCUs) are respectively connected to each one of said plurality of rolls of water detection strips and to said bus line; and
said control station is connected to said bus line so as to be able to uniquely address and identify which water detection strip is issuing a water leak detection signal whereby the location of the water leak is easily and readily identifiable.

* * * * *